No. 778,011. PATENTED DEC. 20, 1904.
P. P. COLER.
DUPLEX GRAIN BINDER.
APPLICATION FILED SEPT. 14, 1904.
NO MODEL. 9 SHEETS—SHEET 1.
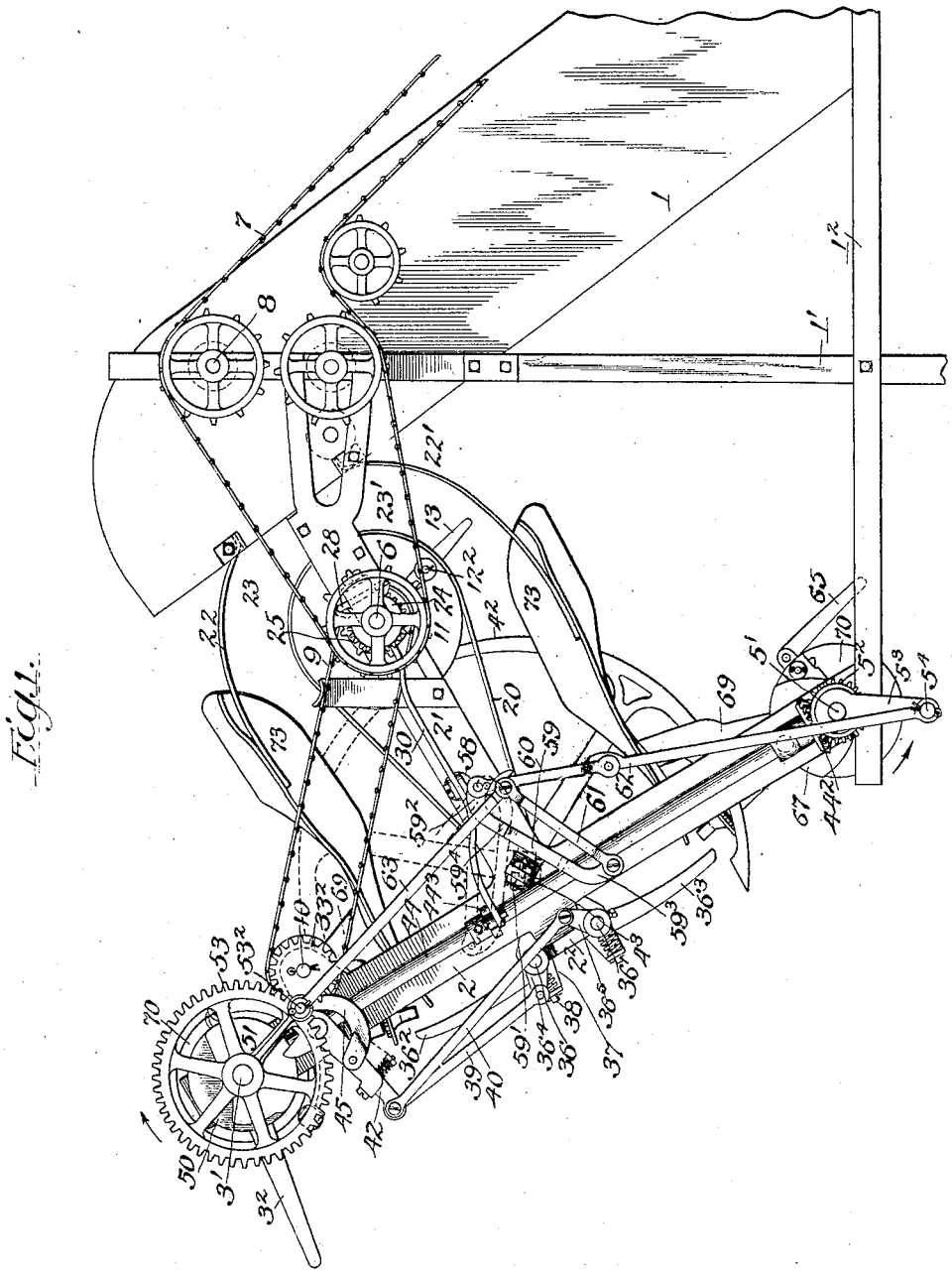
Witnesses:
T. H. Alfreds.
T. W. Hoffmeister.
Inventor:
Peter P. Coler.
By J. C. Narnes,
Attorney.

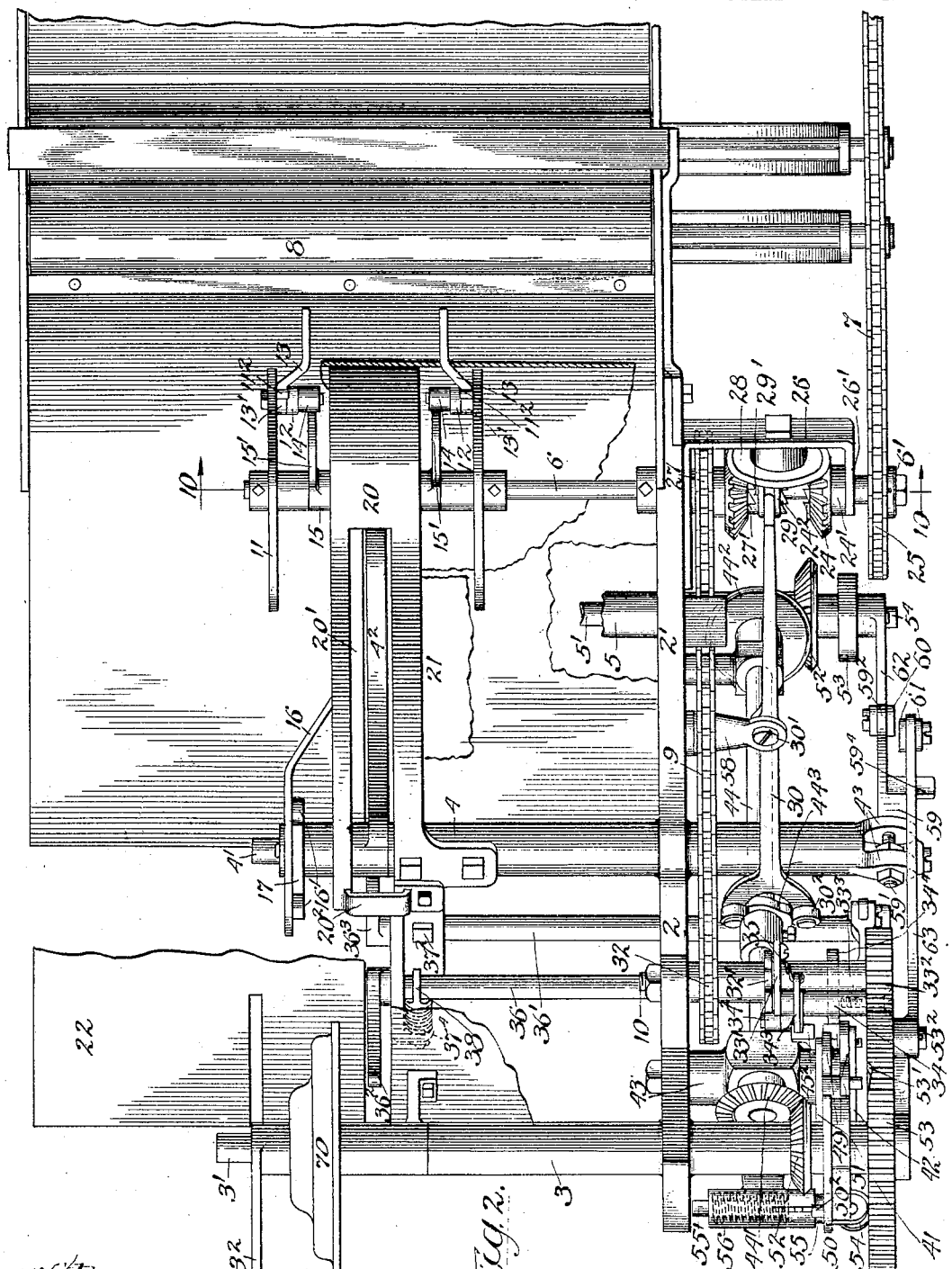

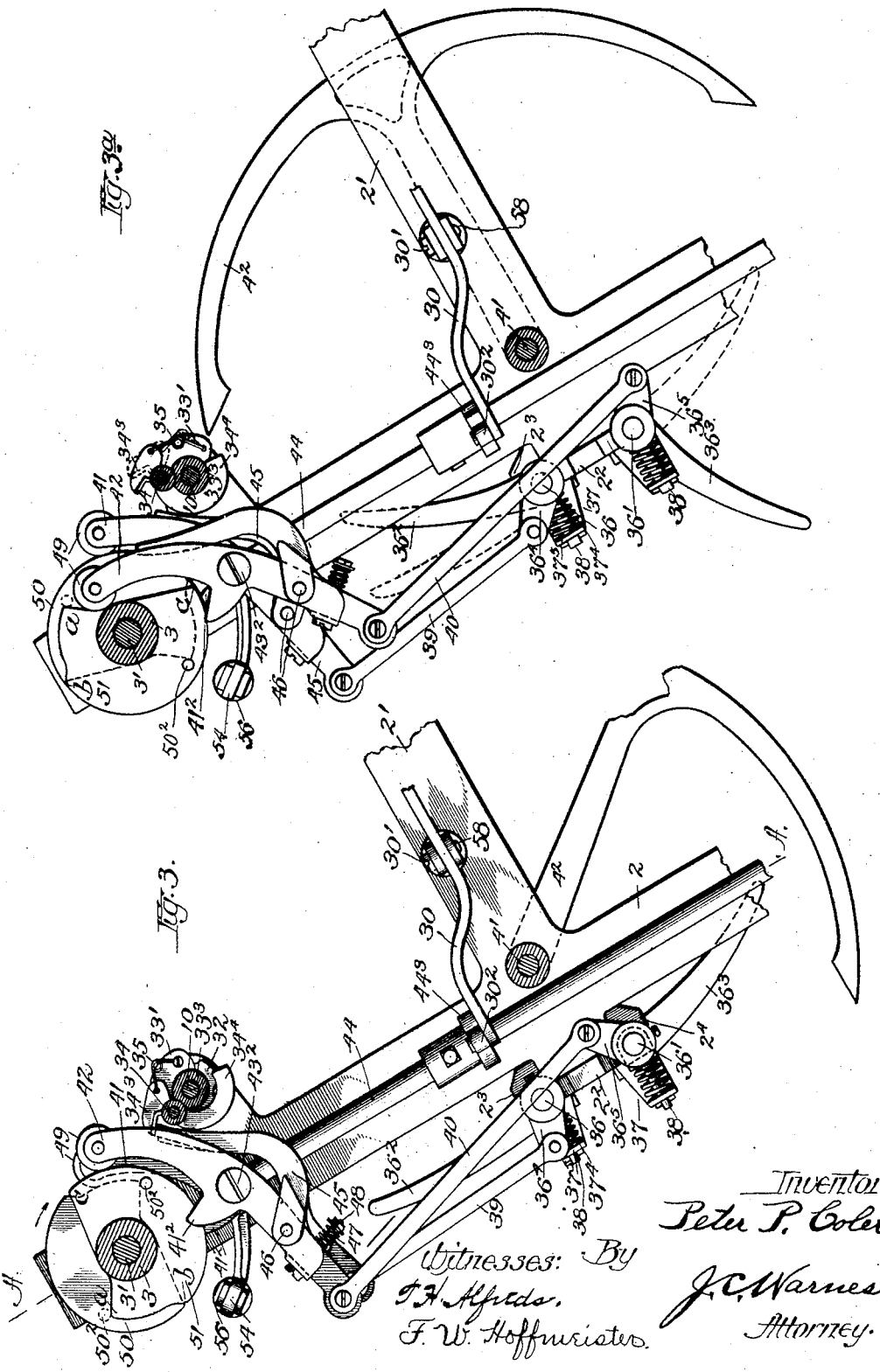

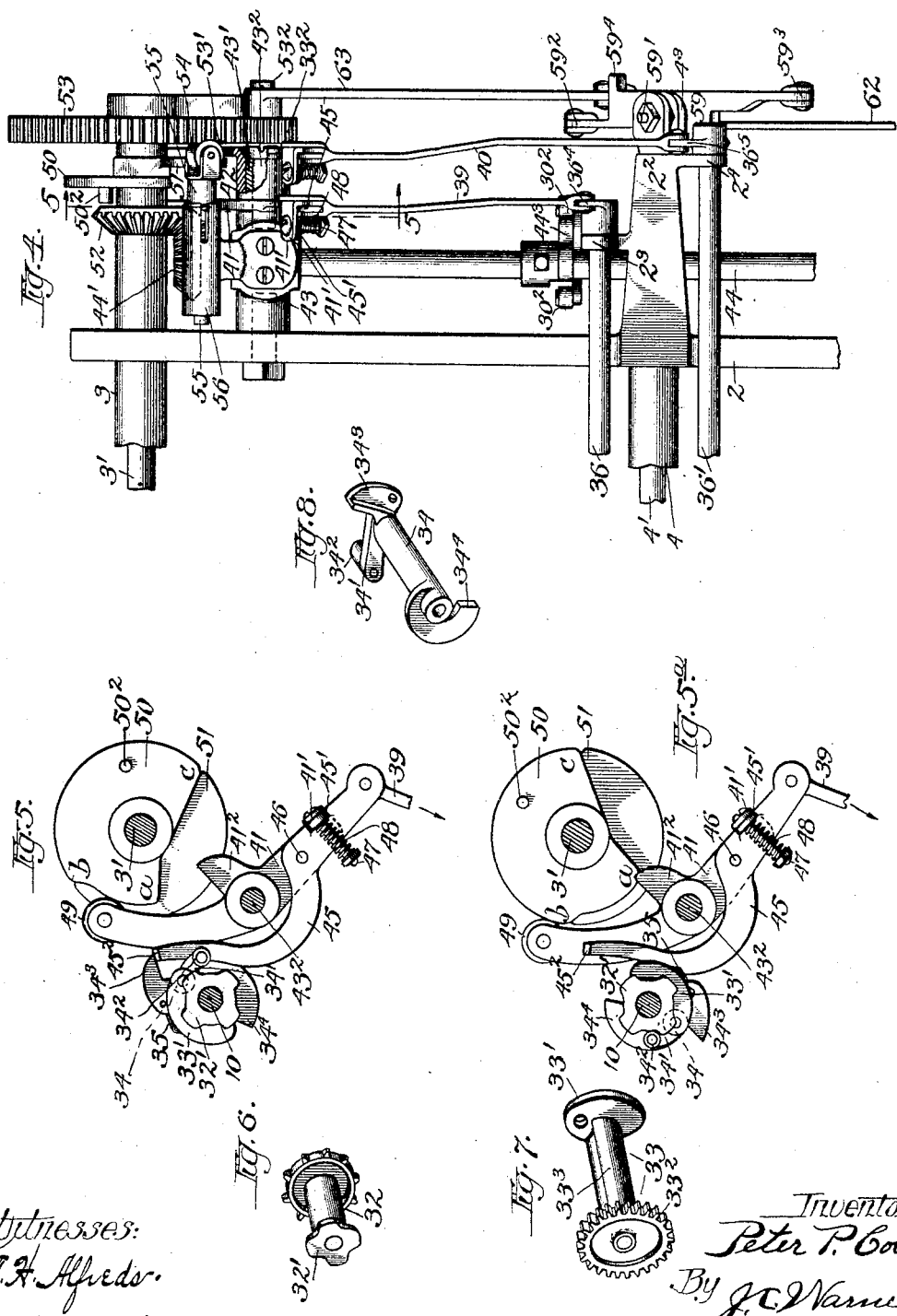

No. 778,011. PATENTED DEC. 20, 1904.
P. P. COLER.
DUPLEX GRAIN BINDER.
APPLICATION FILED SEPT. 14, 1904.
NO MODEL. 9 SHEETS—SHEET 5.
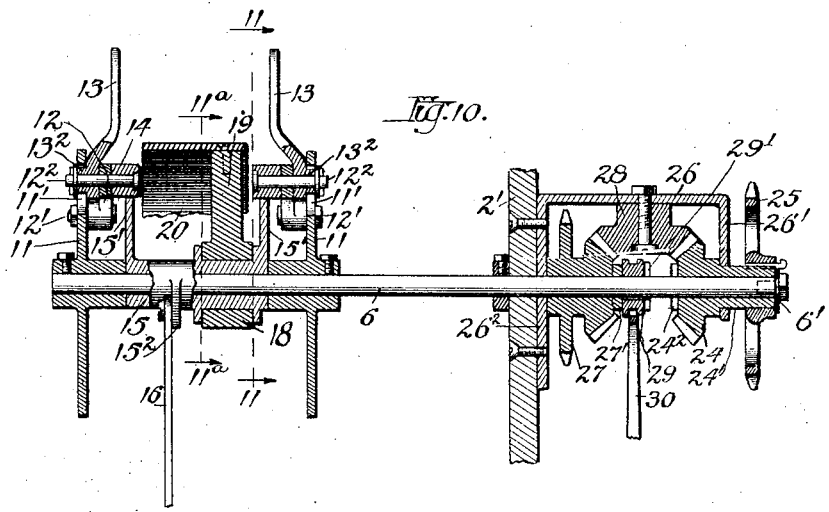
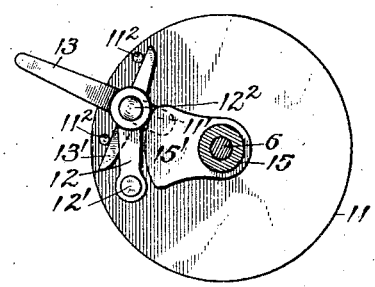
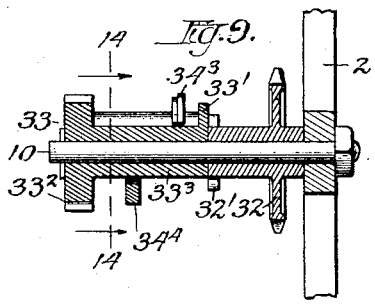
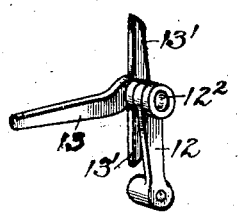
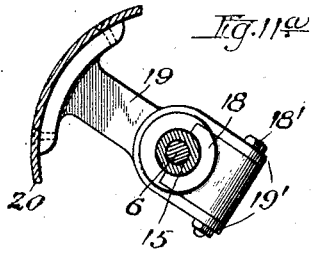
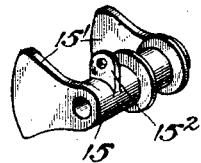
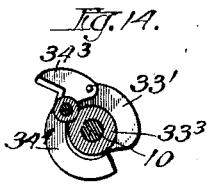
Witnesses:
F. H. Alfredo.
F. H. Hoffmeister.
Inventor:
Peter P. Coler,
By J. C. Warnes,
Attorney.

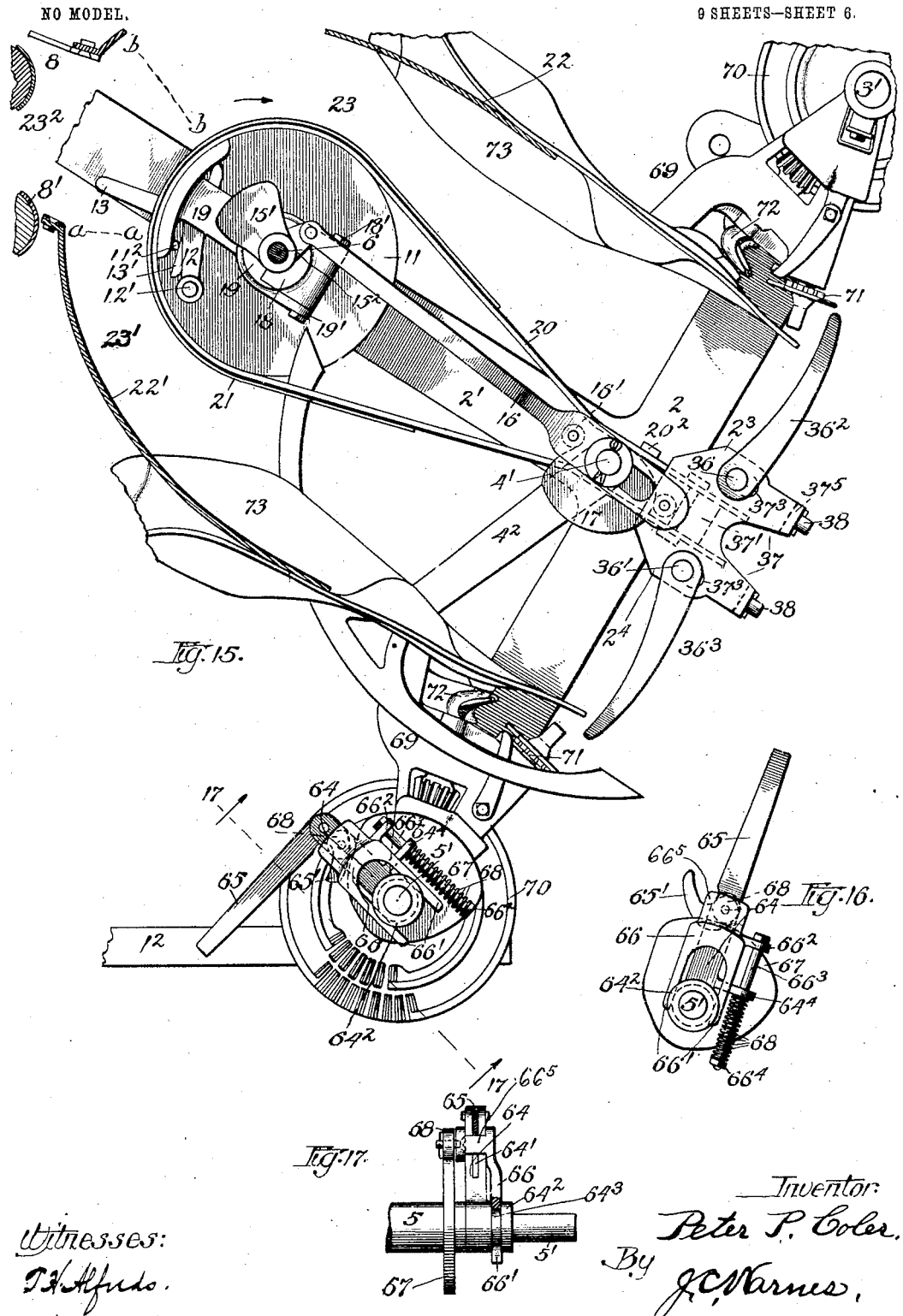

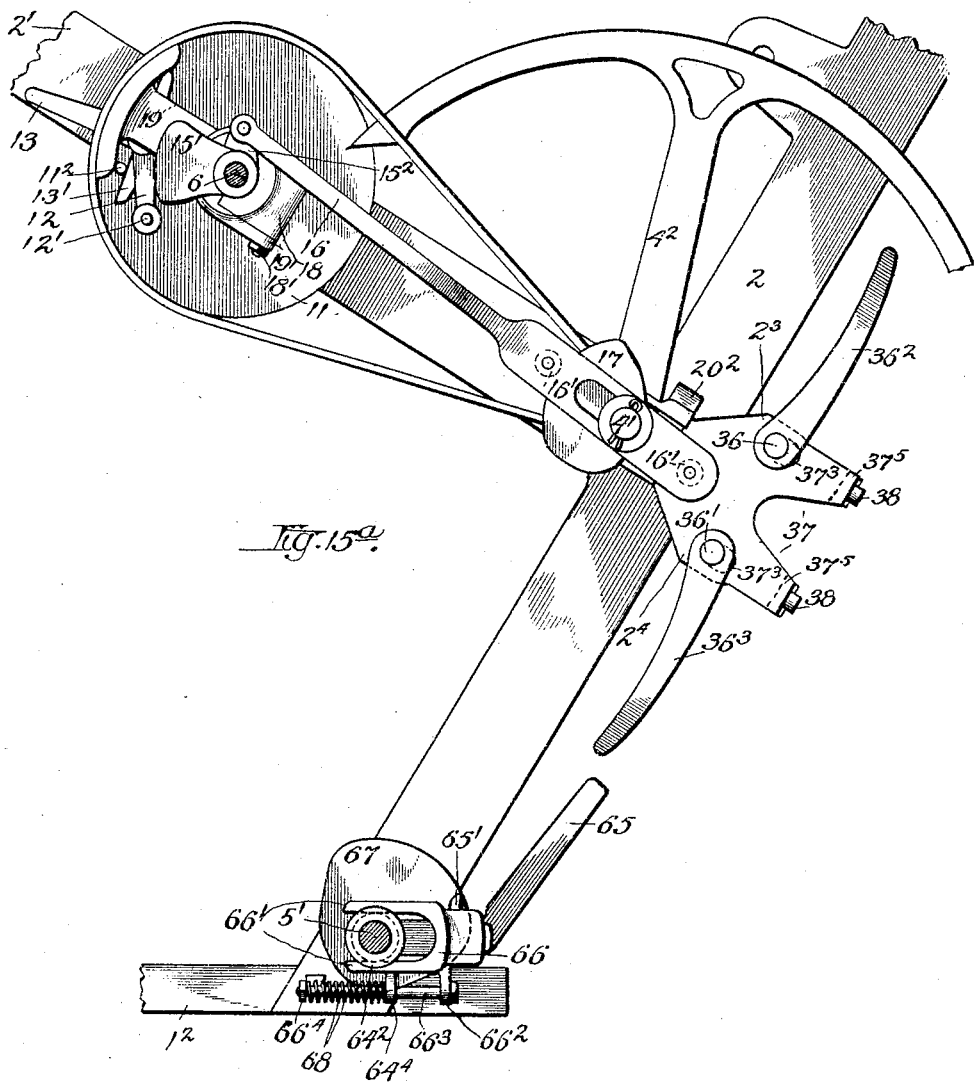

No. 778,011. PATENTED DEC. 20, 1904.
P. P. COLER.
DUPLEX GRAIN BINDER.
APPLICATION FILED SEPT. 14, 1904.
NO MODEL. 9 SHEETS—SHEET 8.
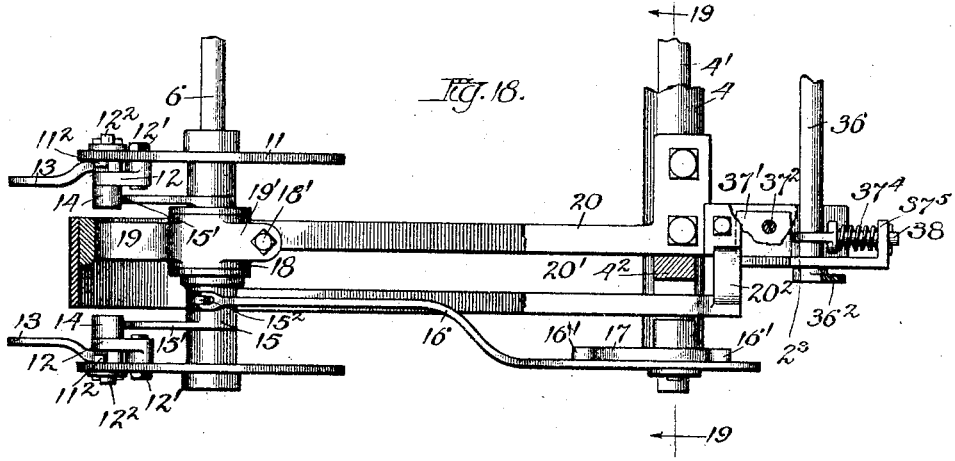
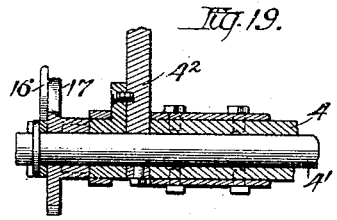
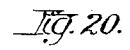
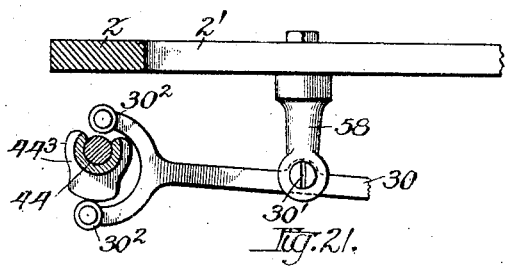
Witnesses:
T. H. Alfreds.
F. W. Hoffmeister.
Inventor:
Peter P. Coler.
By J. C. Warnes,
Attorney.

No. 778,011. PATENTED DEC. 20, 1904.
P. P. COLER.
DUPLEX GRAIN BINDER.
APPLICATION FILED SEPT. 14, 1904.
NO MODEL. 9 SHEETS—SHEET 9.
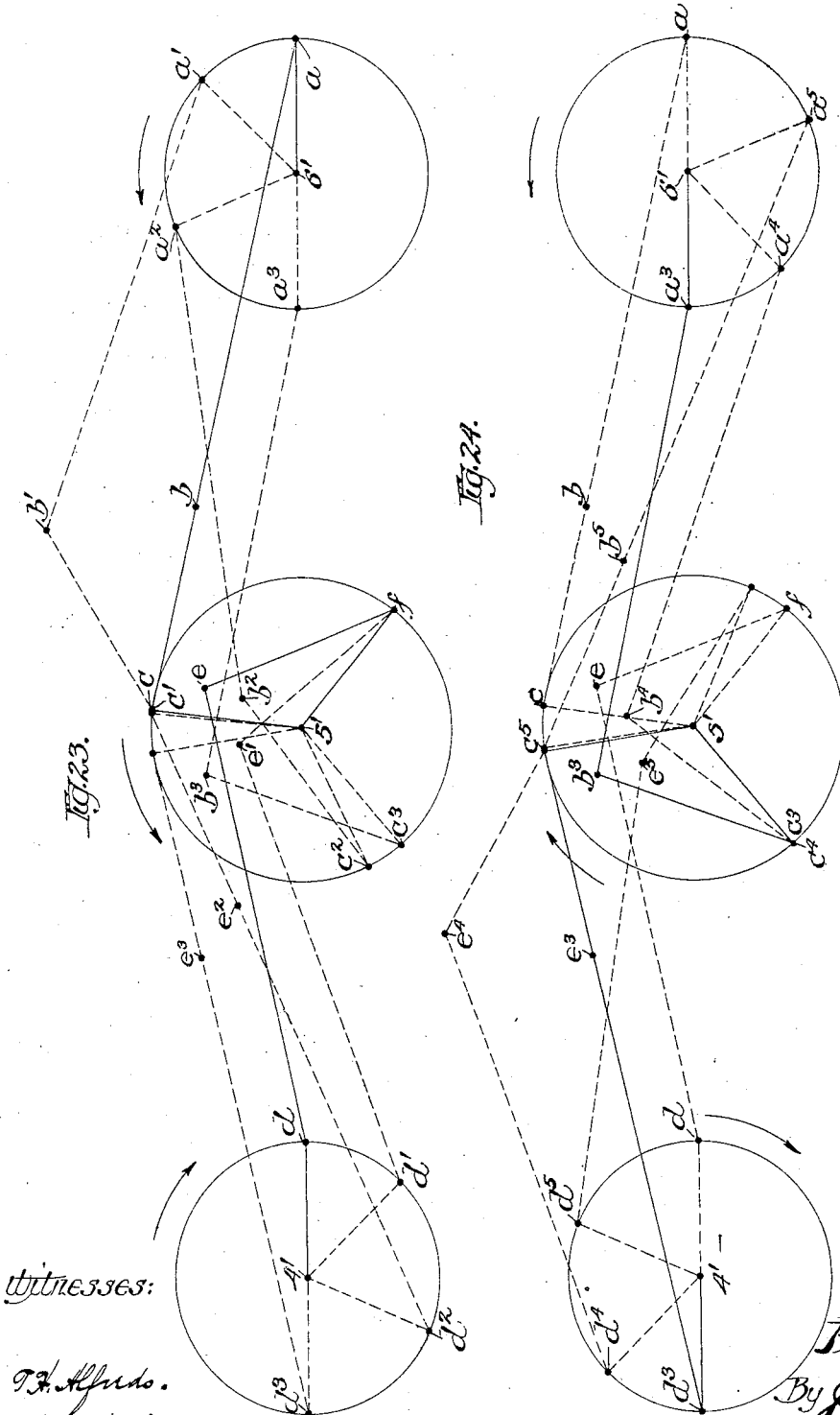

No. 778,011.                                              Patented December 20, 1904.

UNITED STATES PATENT OFFICE.

PETER PAUL COLER, OF CHICAGO, ILLINOIS, ASSIGNOR TO INTERNATIONAL HARVESTER COMPANY, OF CHICAGO, ILLINOIS.

DUPLEX GRAIN-BINDER.

SPECIFICATION forming part of Letters Patent No. 778,011, dated December 20, 1904.

Application filed September 14, 1904. Serial No. 224,369.

*To all whom it may concern:*

Be it known that I, PETER PAUL COLER, a citizen of the United States, residing at Chicago, in the county of Cook and State of Illinois, have invented a Duplex Grain-Binder, of which the following is a complete specification.

The object of this invention is to provide an improved binder attachment of increased capacity for use in connection with grain-harvesters.

The binder attachments of harvesters as ordinarily constructed are provided with needles operating in one direction only—that is, needles which in conjunction with the coöperating mechanism tie the bundles of grain during the forward movement only thereof. In the operation of such a type of binder it follows that the grain will accumulate in the grain passage-way of the deck and be forced against the back of the needle, such accumulation continuing until the needle has returned to its position of rest. This collection of grain is objectionable, as it produces a tendency to choke and stop the machine during the operation of the needle. In a wide-cut harvester this choking tendency is aggravated to such an extent that it becomes necessary to stop the movement of the packers momentarily during the period of time required for the forward and return stroke of the needle or increase the needle speed.

My improvement is designed to overcome the above-mentioned difficulties by making the binder attachment duplex in action—that is, to cause it to coöperate in tying a bundle in both its forward and return movement.

Further subordinate objects will appear in the following description, all of which will be more specifically pointed out in the appended claims.

The preferred construction of my invention is disclosed in the accompanying drawings, in which—

Figure 1 represents a front elevation of my improved binder with a portion of the frame of the harvester shown in connection therewith. Fig. 2 is a plan view of same. Fig. 3 is a front view in elevation, illustrating the construction of the two cams on the upper knotter-shaft with the associated coöperating parts for controlling the movement of the compressor rock-shaft and the compressor-hooks thereon. The cam-gear and link connection of same with the needle-shaft for clearness has been omitted from this view. Fig. $3^a$ is a similar view, but with the parts tripped and the cams advanced practically one-quarter of a revolution, the lower compressor-hook being shown tripped, while the upper one has been moved up to compress the bundle. Fig. 4 is a stubble side elevation of same, the view being taken normal to the line A A on Fig. 3. Fig. 5 represents a rear or reverse view of the said cams, driving-dog, compressor-arm, and the trip-latch mounted thereon, the view being taken as indicated by the line 5 5 in Fig. 4; and Fig. $5^a$ is a similar view, but with the driving-dog and trip-latch shown disengaged or tripped. Fig. 6 is a perspective of the clutch-sprocket; Fig. 7, a perspective of the clutch-gear; Fig. 8, a perspective of the driving-dog, which is mounted on said clutch-gear; and Fig. 9 is a longitudinal section through these parts when assembled in their proper relative positions. Fig. 10 is a section taken longitudinal of the packer-shaft, showing the peculiar construction of the packers and also the reversing and disengaging mechanism located on the forward end of said shaft, the view being taken as indicated by the line 10 10 on Fig. 2. Fig. 11 is a transverse section through the packer-shaft, taken as indicated by the line 11 11 on Fig. 10, this view being designed to show the construction of the packers and cam for "timing" the outward thrust of same; and Fig. $11^a$ is also a transverse section through the packer-shaft, taken as indicated by the line $11^a$ $11^a$ in Fig. 10, this view being designed to show the packer-shaft hanger and its relation to the packer-arm cams. Fig. 12 is a view in perspective of the cam referred to in the description of Fig. 11. Fig. 13 is a perspective of one of the packer-arms and the swinging link controlling same. Fig. 14 is a transverse section through the clutch-gear and driving-dog, as indicated by the line 14 14 on Fig. 9. Fig. 15 is a rear view of the principal portions of the binder, the rear packer-disk, however, being shown removed. This view is designed to illustrate more particularly the manner in which the needle is made to shift the packer-actuating cam, the needle being shown below; and Fig. 15ª is a corresponding view with parts omitted and the needle occupying its upper position. Fig. 16 is a detached view showing the construction and operation of the lower discharge-arm, and Fig. 17 is a view of same showing a side elevation taken as indicated by the line 17 17 in Fig. 15. Fig. 18 represents a fragmentary plan view, partly in section, illustrating the general construction and arrangement of the packers and the packer-cams and also the method of actuating the latter from the cam on the needle-shaft. Fig. 19 is a longitudinal section of the rear end of the needle-shaft, taken as indicated by the line 19 19 in Fig. 18, and Fig. 20 shows detail drawings of the needle-shaft cam. Fig. 21 illustrates the construction of the cam on the gear-shaft and the engaging end of the shifting-lever in connection therewith. Fig. 22 is a longitudinal section of the stop-roller on the cam-gear. Figs. 23 and 24 are diagrammatic views illustrating the peculiar operation of the pitmen which connect the knotter-shafts with the needle-shaft and control the movement of the latter, Fig. 23 showing the various positions of the several parts in the first half-revolution of the knotter-shafts, while Fig. 24 shows the movement of the needle in the second half of the revolution of the said knotter-shafts.

Referring to the drawings, 1 designates a portion of the front A-frame of a harvester, to which is attached my improved binder, and 1' and 1² represent, respectively, the vertical and horizontal members thereof. 2 represents the main upright supporting member of the binder-frame, and 2' a transversely-extending vertically-inclined arm, preferably integral therewith. These parts are shown as having a rectangular cross-section; but for greater strength and less weight parts having a hollow cylindrical cross-section might be adopted.

Extending rearwardly from positions near the upper, lower, and central portions of the member 2 of the binder-frame are the shaft bearings or barrels 3, 4, and 5, which form, respectively, bearings for the upper knotter-shaft 3', the needle-shaft 4', and the lower knotter-shaft 5'.

While this binder has the characteristics of a duplex machine, yet only portions of the device are present in duplicate. For instance, the cord-knotting devices and discharge-arms may be regarded as duplicates; but the packer mechanism, the needle, and other elements in a modified form are made to serve double functions.

6 represents the packer-shaft located intermediate of and above the two knotter-shafts. As the packers on this packer-shaft feed the grain alternately above and below, one set of packers will answer to pack the grain in both spaces. The needle-shaft 4' is operated by pitmen connecting with the packer-shaft, which will hereinafter be described.

Any style of knotter may be used upon the knotter-shaft, and as the knotting mechanism will not modify or in any way affect the functions of the other parts it has been omitted from the drawings in most of the views. It is well understood that any style of knotting mechanism can be adapted to most any binder, and hence only a very general description of the one shown in Fig. 15 will be given.

Continuous motion is imparted to the various parts by the sprocket-chain 7, which connects the packer-shaft 6 with the upper elevator-roller 8, as shown in Figs. 1 and 2. The mechanism for reversing the direction of rotation of the packer-shaft will also be hereinafter fully described. From the packer-shaft 6 motion is communicated by the sprocket-chain 9 to the clutch on the stub-shaft 10. The clutch mechanism and driving-dogs are located on this shaft, and the clutch-gear thereon communicates motion through the cam-gear to the upper knotter-shaft, as clearly shown in Figs. 1 and 2, and from the upper knotter-shaft extending parallel with the frame is the gear-shaft which communicates motion to the lower knotter-shaft.

The compressor rock-shafts are necessarily made in duplicate and are operated in a manner very similar to many heretofore constructed. The two pitmen which connect the needle-shaft with the upper and lower knotter-shafts cause the said needle-shaft with the needle thereon to rock in one direction only during a single operation, each movement completely effecting the tying of a bundle, but the discharge thereof being effected simultaneous with the tying of the next bundle.

A detailed description of the several parts will now be given.

Arranged substantially in line with the center of discharge of the elevators is the packer-shaft 6, journaled at its forward end in the vertically-inclined arm 2' of the binder-frame and at its rear end in a hanger secured to the binder-deck support. To the packer-shaft are rigidly secured two packer-disks 11 11, as shown in Fig. 10. These packer-disks are made to rotate necessarily with the packer-shaft and in alternately opposite directions. On the inner face of each disk is pivotally secured the packer-supporting link 12, the pivotal bearing being formed by the bolt 12'. To the free end of each of these packer-arm-supporting links is pivotally secured the packer-arm 13. Transversely projecting from the pivotal end of the said packer-arms are the lugs 13', these lugs being formed, preferably, integral with the said packer-arms. On the outer side of each packer-arm and concentric with the pivotal connection thereof with its supporting-link is the boss $13^2$, which is engaged by an arcuate slot 11' (see Fig. 11) in the packer-disk 11, said slot being concentric with the pivotal center 12' of the supporting-link 12. The pin $12^2$ forms a pivotal bearing between the free end of the said supporting-link and the packer-arm, the said pin passing through the said boss $13^2$ and being secured in place in said slot by a pin and washer, as clearly shown in Fig. 10. On the inner side of the pin $12^2$ is mounted the cam-engaging roller 14, the arrangement of both disks with respect to the above-described parts being the same. Pins $11^2$ in the disks 11 limit the vibratory movement of the packer-arms 13 on their supporting-links 12, and when the said packers are held outwardly and in a position in which both the said lugs 13' are made to engage with the said pins $11^2$ the packer-arms become rigid and radial. It is evident from an inspection of Fig. 11 that in the absence of means for holding the lugs of the packer-arms against such pins the links 12 would be free to swing inwardly and the packer-arms thus be rendered entirely flexible and free to yield to the slightest resistance. Such means for controlling the radial movement of the packer-arms is afforded by the double packer-cam, which consists of the cam-sleeve 15 sleeved loosely upon the packer-shaft 6 and made to occupy a position intermediate of the packer-arm disks 11, as is also clearly shown in Fig. 10. On each end of this cam-sleeve 15, and correspondingly disposed is provided a cam 15' of a sectoral form and an angular extent somewhat less than a quadrant, as indicated in Figs. 11, 12, and 15. It is evident that during that portion of the stroke in which the rollers 14 ride upon the crest of the cams 15' the packers will be held rigid, and, furthermore, that if the packers were held rigid for their entire revolution the straw would be drawn up by them between the upper and lower branch of the binder-deck. Hence it is desirable to render them operative for only a little less than a quarter of a revolution. It is further evident from an inspection of Figs. 1 and 15 that when the packers are made to rotate in an opposite direction then in order to properly receive and deliver the grain a variation in the point at which the packer-arms become rigid or effective will be required. This result is effected by shifting the packer-cams 15', to accomplish which an arm $15^2$ is provided on said cam-sleeve 15, this arm connecting with and being operated by the cam-shifter link 16. The cam-shifter link is operated by the cam 17 on the needle-shaft 4', as clearly shown in Figs. 15 and $15^a$. The cam 17 is secured to and rotates with the needle-shaft 4' (see Figs. 19 and 20) and is made to rotate between the rollers 16' on the shifter-link 16, and thus produce longitudinal movement of the latter, by which the required amount of rotative movement will be imparted to the cam-sleeve 15.

Intermediate of the length of the cam-sleeve 15 is formed a bearing (see Figs. 10 and $11^a$) adapted to receive the half-box 18, which, with the corresponding half-box formed in the hanger 19, affords a support for the rear end of the packer-shaft, as well as means which will prevent longitudinal movement of the packer-shaft cam. This hanger 19 and half-box 18 are securely held together by the bolt 18', which engages the lugs 19' of said hanger, as illustrated in Fig. $11^a$. The hanger 19 is of a length substantially equal to the radius of the packer-disks 11, the outer end thereof terminating in a sector-shaped end, which is secured to and supported by the deck-support 20, as set forth in Figs. 10 and 15. This deck-support 20 is made to terminate at its upper end in a loop having a diameter substantially equal to that of the packer-disks, the two branches of the loop converging downwardly and stubbleward to the needle-shaft bearing or barrel 4, to which they are rigidly secured and by which they are firmly supported, as indicated in Figs. 2, 15, and 18. The deck-support is provided with a slot 20' in both its upper and lower branches, through which slot the needle is projected. As the rear upper branch of the deck-support contacts at its lower end with the rocking hub of the needle, it is provided with a forwardly-projecting lug $20^2$, this lug being secured to the forward loop, as indicated in Figs. 2 and 18. The upward bend in this lug is made in order to provide room for the set-screw, which secures the needle to the needle-shaft. Extending about this deck-support 20 both above and below is the deck-plate 21, said deck-plate conforming to the upper loop of said support. For clearness the deck has been omitted from most of the drawings, only a fragment thereof being shown in Figs. 2 and 15.

22 and 22' represent the upper and lower grain-shields, respectively, which, in conjunction with the above-described deck-plate 21, form the upper and lower grain passage-ways 23 and 23', respectively. The space lying between the elevator-rollers 8 and 8' and the packer mechanism and below the shield 22 (see Fig. 15) constitutes the initial grain-receptacle $23^2$, from which leads the upper and lower grain passage-ways 23 and 23'. Since the single set of packers is required to force the grain alternately into the upper and lower grain passage-ways, the following-described reversing mechanism is adopted: Referring particularly to Figs. 2 and 10, on the forward end of the packer-shaft 6 will be found the bevel-pinion 24, provided with a long hub 24', to which is keyed the driving sprocket-wheel 25. This bevel-pinion 24 and sprocket-wheel 25 are thus, in effect, as one piece and sleeve loosely upon the forward end of the packer-shaft, being held thereon by the nut and washer 6'. On the inner end of the said pinion 24 are formed the clutch-teeth $24^2$, the function of which will hereinafter be described.

26 is a plate forming a bevel-gear frame, the arm 26' thereof supporting the hub of the said bevel-pinion 24, while the arm $26^2$ is secured to the transversely-extending and vertically-inclined arm 2' of the binder-frame, the packer-shaft 6 being engaged also by the said member $26^2$. Within the gear-frame 26, adjacent to the rear arm $26^2$ thereof and loosely mounted upon the packer-shaft 6, is the sprocket-gear 27, the gear portion thereof being operatively connected with the bevel-pinion 24 by means of the intermediate bevel-gear 28. On the sprocket-gear 27 are formed also clutch-teeth 27'. Upon the packer-shaft 6, within the space between the sprocket-gear 27 and the bevel-pinion 24, is feathered the clutch-sleeve 29, having formed on either end thereof the clutch-engaging teeth 29'. 30 is the shifting-lever, by means of which the position and movement of the said clutch-sleeve 29 is controlled. It will be understood by the above description that whenever the said sleeve 29 is forced into engagement with the clutch-teeth on the bevel-pinion 24 the packer-shaft 6 will be made to rotate in a direction corresponding with that of the driving-sprocket 25, and when said clutch-sleeve is forced into engagement with the clutch-teeth of the sprocket-gear 27 it will be made to rotate therewith, and hence in a direction opposite to that of the sprocket-wheel 25. This clutch-shifting lever 30 pivots at the point 30' and is actuated by a cam on the gear-shaft 44. From the sprocket portion of the sprocket-gear 27 motion is communicated to the clutch-sprocket 32 of the clutch mechanism on the stub-shaft 10, which mechanism will now be described.

In Fig. 6 is shown a perspective of the clutch-sprocket 32, above referred to, which is provided on its forward end (the left-hand end as viewed in this figure) with a series of teeth 32'. This clutch-sprocket sleeves loosely upon the stub-shaft 10 adjacent to the binder-frame 2 and in line with the sprocket portion of the sprocket-gear 27. Sleeved loosely upon the said stub-shaft also and adjacent to the clutch-sprocket 32 is the clutch-gear 33, a flange 33' being provided on the rear end thereof. The gear portion $33^2$ of this clutch-gear 33 meshes with and drives the cam-gear 53 on the upper knotter-shaft. The clutch-gear is provided with a long barrel $33^3$, which not only affords ample bearing therefor, but also affords a space in which is mounted the driving-dog 34. This driving-dog 34, a detailed perspective of which is shown in Fig. 8, is interposed between and pivotally mounted upon the flange 33' and the gear portion $33^2$ of the clutch-gear 33. The rearward end of the driving-dog is provided with a transversely-extending arm or pawl 34', provided with the roller $34^2$, these two elements forming the engaging pawl of the driving-dog. Disposed, preferably, at about a right angle to this arm 34' is the inner trip-stop $34^3$, adapted to engage the trip-latch of the compressor-arm, as hereinafter more fully described. A spring 35 reacts between the trip-stop $34^3$ and the flange 33' on the clutch-gear 33, the normal tendency of this spring being to rotate the driving-dog about its axis counter-clockwise, or to the left as viewed in Fig. 3. The effect of this will be to hold the roller $34^2$ of the arm 34' in engagement with one of the series of teeth 32' of the clutch-sprocket 32. On the other or forward end of the driving-dog 34 and subtending the opposite side thereof is arranged the trip-stop $34^4$, which is also adapted to engage the trip-latch of the front compressor-arms in the same manner as does $34^3$. It will be manifest from an inspection of Figs. 3 and 5 in connection with the detailed views in Figs. 6, 7, and 8 that whenever resistance is interposed (by the trip-latches of the compressor-levers) in the path of travel of the trip-stops $34^3$ and $34^4$ the driving-dog 34 will be made to rotate to the right, or clockwise, overcoming the resistance of the spring 35 and disengaging the roller $34^2$ of the pawl 34', thus leaving the clutch-sprocket free to rotate without imparting movement to the cam-gear shaft.

The tripping mechanism, which coöperates with the last-described mechanism, is actuated, as is the general practice, through the compressor-hooks. Referring more particularly to Figs. 3, $3^a$, and 4, 36 and 36' represent, respectively, the upper and the lower compressor rock-shafts. The forward bearings of these rock-shafts are formed by the forwardly-projecting arm $2^2$ of the binder-frame 2, this arm $2^2$ being provided with the upwardly-projecting lug $2^3$, which forms a bearing for the upper compressor-shaft 36, while the downwardly-projecting lug $2^4$ forms a bearing for the lower compressor-shaft 36', as clearly indicated in Figs. 3 and 4. The support for the rear ends of said compressor-shafts is formed by the bracket 37, (see Figs. 15 and 18,) which is secured, preferably, to the downwardly-projecting free ends of the upper or lower branches of the deck-support 20. This bracket 37 is provided with a forwardly-projecting lug 37', which lies between the said projecting ends of the deck-support 20, the securement thereto being effected by the bolt $37^2$. In the upper and lower portion of said bracket 37 are formed the slots $37^3$, which receive the rear ends of the compressor-shafts, and to provide for lateral movement thereof and to render them yielding in a line substantially parallel with the grain-deck the shafts are engaged by the shouldered eyebolts 38. A spring $37^4$ is placed upon each of these eyebolts, which acts between the shoulders thereof and the forwardly-projecting lugs $37^5$ of the bracket 37, which engage the said bolts. This construction affords a laterally-yielding bearing for the rear end of the compressor rock-shafts. On the rear end of these shafts 36 and 36' and immediately adjacent to the said bracket 37 are rigidly secured the compressor-fingers or hooks $36^2$ and $36^3$, respectively, which form the stops or yielding gates for the upper and lower grain passage-ways, respectively. On the forward end of the upper and lower compressor-shafts are rigidly secured the short arms or cranks $36^4$ and $36^5$, respectively. The free ends of these short arms $36^4$ and $36^5$ are engaged by the compressor-links 39 and 40, respectively, which connect with the rear and front compressor-arms 41 and 42, respectively. These compressor-arms are disposed longitudinally coincident, have a common pivotal center, and are duplicates one of the other, so that a description of one will suffice for both. The pivotal support for the compressor-arms is formed by the bearing 43' (see Figs. 3 and 4) on the bracket 43, which may be integral with the frame 2 of the binder or may be constructed of an independent piece and bolted thereto, as shown in Fig. 4. This bracket 43 also forms a journal-bearing for the upper end of the gear-shaft 44. The compressor-arms are held in position on the said bearing 43' by means of the screw $43^2$. Each of the compressor-arms 41 and 42 is comprised of two parts pivotally connected—viz., the compressor-arm proper and the trip-latch 45—the pivotal point of connection therebetween being at the point 46. At the lower end of each compressor-arm is the laterally-projecting lug 41', (see Fig. 5,) which is made to register with a corresponding lug 45' on the trip-latch 45. A bolt 47 passes through apertures in these lugs and receives the spring 48, a nut on the end of the bolt holding the spring in place. Through the compressor-link 39 (see Figs. 3 and $5^a$) a force is applied to the said trip-latch 45, acting in the direction indicated by the arrow in these figures. On the upper end of each compressor-arm is mounted a roller 49, these rollers bearing against the rear and forward cams 50 and 51, while the upper ends of the trip-latch levers terminate in the heads $45^2$ and are adapted to be impinged by the trip-stops $34^3$ and $34^4$ on the driving-dog 34. The compressor-arms are provided with the spurs $41^2$, the function of which is to engage the tappet-pins $50^2$ on the cams 50 and 51, and thereby positively force the rollers 49 into the depressions of said cams. The normal position, or the position when at rest, of these several parts (the rear compressor-arm being here shown) appears in full lines in Fig. 5, and the position of the trip-latch after being released or tripped by the compressor-hooks and rock-shaft through the links 39 and 40 is indicated by the position shown in Fig. $5^a$. In the operation resulting in the above-described movements the compressor-arm proper, 41, is restrained from any rocking movement by the roller 49 resting upon the cam 50; but the trip-latch 45 rocks about the pivotal center 46, the spring 48 yielding to such movement until the head $45^2$ of said lever has been disengaged from the trip-stop $34^3$. A clearer conception of the functional relation of these and other elements with the various coöperating parts of the mechanism will be had by reference to the general description of the operation of the machine hereinafter to be made.

Mounted on the forward end of the knotter-shaft 3' and rigidly secured thereto are the cams 50 and 51, the cam-gear 53, and the bevel-pinion 52, the said cams 50 and 51 lying between the bevel-pinion and cam-gear and being, in effect, integral therewith. The bevel-pinion 52 meshes with and drives the pinion 44' on the bevel-gear shaft 44, which through the pinion $44^2$ on the lower end thereof, with its mating pinion $5^2$ on the forward end of the lower knotter-shaft 5', imparts motion to the said lower knotter-shaft. In this manner the two knotter-shafts are directly connected and their relative movement fixed. Hence when the needle is "timed" with one it will be timed with both. If the lower knotter-shaft were driven independently of the upper one, then separate "timing" would be required, which would complicate the adjustment thereof. The cams 50 and 51 are identical in construction, but reversed in position—that is, the corresponding parts of each are diametrically opposed.

By reference to Figs. 3, $3^a$, and 5 it will be seen that the roller 49 of the compressor-arm lies between the points $a\,b$ when the binding mechanism is at rest. The portion $b\,c$ represents the crest of the cam or the compressing portion, on which the roller rides when the bundle is being bound, and is of a greater radial distance than the portion $a\,b$. $c\,a$ represent the depressed portion of the cam into which the roller drops and by which the compressor-hook is released, permitting the bundle to be discharged.

The cam-gear 53 is provided with two oppositely-disposed depressions 53' in the periphery thereof. When at rest or in normal position, these depressions 53' register with the locking-roller 54, which is mounted on a plunger 55. This plunger is supported in a plunger-bracket 56, secured to the bracket 43, as shown in Figs. 2, 4, and 22. The barrel of this bracket receives the plunger 55'; and a spring 57 reacts between a shoulder 54' on said plunger and the rear end of said barrel, causing the roller 54 to be pressed forcibly into the depression 53' on the cam-gear 53, and thereby lock said cam-gear and parts controlled thereby in position of rest.

The packer-reversing mechanism is constructed and operated as follows: The shifting lever 30, before mentioned in connection with the reversing mechanism on the packer-shaft, is pivotally mounted upon a post 58, secured to the main frame of the binder. The upper end of this shifting lever 30 is bifurcated and embraces a groove in the periphery of the clutch-sleeve 29 in a manner well understood. The lower end of said lever terminates also in a bifurcated end, each branch thereof being provided with a roller $30^2$, between which lies the cam $44^3$, rigidly secured to the gear-shaft 44. This cam $44^3$ is provided with a single projection, which will therefore cause the shifting lever to be vibrated twice in each revolution of the bevel-gear shaft 44. As the upper knotter-shaft is required to rotate only one-half a revolution for the tying of each bundle, the lever 30 will be shifted alternately from side to side as the needle comes to a position of rest at the end of each stroke. From this it is obvious that as the needle is made to pass from its upper to its lower position, or vice versa, the packer-shaft will be made to change its direction of rotation, and, furthermore, that as the said cam $44^3$ is formed with only a single projection, the other portion of the contacting surface thereof being concentric with the center of said gear-shaft, the shifting lever will be held in an intermediate position or in a position in which the clutch-sleeve 29 will engage neither the bevel-pinion 24 nor the sprocket-pinion 27, thus causing the packer-shaft to be intermittently operative or to remain stationary during practically all that period of time occupied by the movement of the needle.

On the rearward end of the needle-shaft $4'$ is rigidly secured the needle $4^2$, this needle operating in a manner similar to that element found in such class of machines, the only difference in construction being that the needle is double-pointed. Each point is arranged to coöperate with the cord-knotting mechanism on the upper or lower knotter-shaft. It follows, therefore, from the peculiar manner in which the needle operates that it must move only in one direction and then stop while a bundle accumulates on the opposite side thereof. While it is found preferable to provide two grain passage-ways, a double-pointed and double-acting needle might be used in connection with a single grain passage-way.

It will be manifest from an inspection of Fig. 1 that the upper and lower knotter-shafts must move in reverse directions and, furthermore, that these knotter-shafts perform complete rotation, although not continuous, and each always in the same direction. Because of the above-described conditions under which the knotter-shafts operate it is necessary to impart a rocking movement to the needle-shaft, the movement being preferably accelerated, and this is accomplished by the following described pitman connections: The cam-gear 53 is provided with the wrist-pin $53^2$, while the forward end of the lower knotter-shaft is provided with the crank $5^3$, rigidly secured thereto and having at its free end the wrist-pin $5^4$, and on the forward end of the needle-shaft is rigidly secured the slotted head $4^3$. 59 is a double crank-arm, made adjustable in effective length by being provided at the center thereof with a stud-bolt $59'$, the said stud-bolt being received by suitable apertures in the split head $4^3$. Nuts engage this stud-bolt on either side of the opposite wing of said split head, (see Fig. 1,) and thus afford means by which the said lever-arm 59 is held rigidly in place and adjusted with respect to its distance from the center of oscillation of the needle-shaft. The above-described adjustment enables the needle to be properly timed with the cord-knotting devices. To secure the proper movement and leverage, the upper and lower cord-knotting devices are connected with this double crank-arm by means of pitmen, preferably jointed, and comprised each of a short and a long link. On either of the crank-arms (see Fig. 1) is provided the upturned eyes $59^2$ and $59^3$, respectively. Short links 60 and 61, of a length somewhat less than the length of said crank-arm 59, are pivotally connected to the eyes $59^2$ and $59^3$ thereof, respectively. The long link 62 pivotally connects the free end of the short link 60 and the wrist-pin $5^4$ on the crank $5^3$ of the lower knotter-shaft, while the long link 63 pivotally connects the free end of the other short link 61 with the wrist-pin $53^2$ on the cam-gear 53. The connections between the links 60 and 62 and the links 61 and 63 are such that a lock or rule joint is effected, the locked side of said joint lying opposite from the center of the needle-shaft. Two spurs $59^4$ are formed on either side of the crank-arm 59 and are so disposed that when the parts are rocked the said spurs will be caused to impinge the short links 60 and 61 near the free ends thereof and "break" the joints above described. By reference to Fig. 1 it will be seen that the joint between the links 61 and 63 lies nearer the center of oscillation of the needle-shaft than does the pivotal connection of the link 60 with the arm $59^2$. Because of this fact and since both pitmen have practically the same endwise or radial movement it will require only a slight rotation of the knotter-shafts $3'$ and $5'$ to cause the link 61 to engage one of the spurs $59^4$. During this movement the needle-shaft $4'$ will be given some movement, but no considerable amount. In fact, the double crank-arm 59 can be adjusted to such a distance from the center of oscillation of the needle-shaft that in the position of rest, or the "home" position, the link 61 will contact one of the spurs $59^4$, in which event it will be necessary to provide means for breaking the joints of the pitmen. This has not been found necessary, however, as the slight movement imparted to the needle by the end thrust of the pitmen does not unfavorably affect the operation of the machine. In the diagrammatic views shown in Figs. 23 and 24, illustrating the relative movement of the needle-shaft and knotter-shafts, for simplicity the position of rest, or home position, is shown on the line of centers of the two knotter-shafts. While the relative position of parts at the beginning and end of the stroke does not quite correspond with that shown in the figure, the principle involved remains the same. The operation of these jointed pitmen is as follows: In Fig. 1 the position of the crank-arm 59 and connecting-links is clearly shown, the needle being in its lower position. As the knotter-shafts begin to rotate, (it being remembered that because of the connecting gear-shaft 44 their rotation begins simultaneously and continues uniform,) their respective rotations being in the direction indicated by the arrows in Fig. 1, only a limited movement will be imparted to the needle-shaft until the link 61 contacts with the spur $59^4$ of the crank-arm 59. The long links are of sufficient length that when the needle is at rest the free ends of the short links will occupy a position some distance removed from the spurs $59^4$, thus providing lost motion, which will afford greater latitude of adjustment of these parts. As soon as the short links contact the said spurs, however, the rocking movement of the needle will begin. The effective lever-arm of the link 63 will be comparatively short in the first part of the movement, and hence the speed of the needle at this part of the stroke, when little resistance is met, will be correspondingly greater—a result desired, since slower movement can be applied to the needle when it is subjected to a greater resistance near the end of its stroke. The crank-arm 59 and the connecting-pitmen after the needle has reached its upper limit will be made to occupy a position, as indicated by dotted lines in Fig. 1, which is just the reverse to that shown by full lines in this figure. The return of the needle to its lower position will be accomplished in the same manner as its movement upwardly. The accelerated speed imparted to the needle-shaft by the peculiar arrangement of the pitman connection therewith is illustrated in Figs. 23 and 24. In these figures, $4'$, $5'$, and $6'$ respresent, respectively, the centers of the upper knotter-shaft, the needle-shaft, and the lower knotter-shaft. The lines $a\,b$ and $b\,c$ represent the links 62 and 60, respectively, the lines $d\,e$ and $e\,f$ the links 63 and 61, respectively, while the points $d$ and $a$ represent the wrist-pins on the upper and lower knotter-shafts, respectively. $c$ and $f$ represent the pivotal connections of the crank-arm 59 with the pitmen, and the line $c\,5'\,f$ represents the crank-arm 59. In these figures the relative movement of the several parts is illustrated at different points in the path of movement of the needle and knotter shafts. Referring to these figures, the angular movement of the wrist-pin on the lower knotter-shaft in taking up the lost motion above referred to will be represented by the angle measured by the arc $a\,a'$ and the corresponding movement on the upper knotter-shaft by the arc $d\,d'$. The needle-shaft will be given only a limited angular movement; but the packer mechanism will have been disengaged. The second period of movement of the lower knotter-shaft, which represents half the time occupied by the needle in its travel, is indicated by the arc $a'\,a^2$, the corresponding movement of the upper knotter-shaft by the arc $d'\,d^2$, and the needle-shaft by the arc $c'\,c^2$, which is seen to be by far the greater part of its movement. In the third period, which represents the second half of the time occupied by the needle in its upward travel, the lower and upper knotter-shafts have angular movement indicated by the arcs $a^2\,a^3$ and $d^2\,d^3$, respectively, while the movement of the needle is very slight, the distance being represented by the arc $c^2\,c^3$. This will give slow movement to the needle, and hence great power when the strain is greatest, and also afford ample time for the operation of the knotting mechanism. The point marked $c^3$ represents the end of travel of the needle in its upward direction. Here the needle rests until a bundle is formed in the grain passage-way below. The relative movement of the several parts in the return of the needle to its lower position is practically the same as that just described and is shown in Fig. 24, in which the arcs $a^3\,a^4$ and $d^3\,d^4$ represent the movement of the lower and upper knotter-shafts, respectively, while taking up the lost motion. $c^3\,c^4$ are coincident, indicating no movement of the needle. In the first return period the movement of the lower and upper knotter-shafts are represented by the arcs $a^4\,a^5$, $d^4\,d^5$, and the comparatively great movement of the needle by the arc $c^4\,c^5$. The second return period, which brings the parts back to the starting-point, is represented as before, the lower and upper knotter-shafts by the arcs $a^5\,a$ and $d^5\,d$, while the comparatively small movement of the needle is represented by the arc $c^5\,c$.

To eject the bundles after having been bound from the grain passage-way, ordinary discharge-arms may be used; but I prefer to use an ordinary discharge-arm on the upper shaft only and a modified form on the lower knotter-shaft. This is done in order to avoid getting too near to the ground with the arm when in its lower position and for other obvious reasons when employing a discharge-arm located beneath the deck. On the upper knotter-shaft $3'$ is rigidly secured one or more discharge-arms $3^2$. On the lower knotter-shaft $5'$, adjacent to the end of the barrel 5, is rigidly secured the first or fixed joint 64 of the discharge-arm, the outer end of this joint being provided with a longitudinal slot 64', in which is pivotally mounted the second joint or arm proper, 65, this arm being provided with a hook 65' near its pivotal end. Arranged adjacent to the fixed joint 64 is the boss 64², and on its end is provided the annular groove 64³. Sleeved upon this joint 64 is a sliding box or guide 66, provided with two longitudinally-extending and laterally-disposed arms 66', which are adapted to fit within the annular groove 64³ in the boss 64². 66² is a lug on the guide arranged to register with the lug 64⁴ on the fixed joint 64. Apertures in these lugs receive the bolt 66³, upon the downwardly-projecting end of which is secured the coil-spring 68 by means of the nut 66⁴. This spring exerts a force tending to pull the sliding box toward the center of the knotter-shaft 5, upon which it is mounted. The neck portion of the guide 66 is provided with a transversely-extending portion 66⁵, adapted to engage the hook 65' on the arm 65. The effect of such construction will be that when the guide 66 is forced upwardly, so that the neck portion thereof is made to engage the arm 65, the said arm will thereby be held rigid, because the pivotal point thereof lies within the guide, (see Fig. 16,) and hence renders flexure impossible. As the guide moves toward the shaft, however, the portion 66⁵ of the neck will impinge the hook 65' of the arm 65 and will deflect it downwardly and rearwardly to the position shown in Fig. 15. Positive means for moving the sliding guide outwardly is provided in the cam 67, preferably made integral with the inner end of the barrel 5 of the main frame, which forms the journal-bearing for the lower knotter-shaft 5'. An antifriction-roller 68 is mounted upon the side of the guide 66, this roller being arranged in alinement with the said cam 67. This cam 67 is so constructed that it will hold the sliding box out far enough on the discharge-arm to render the arm 65 thereof radial and rigid, as shown in Fig. 16. Practically one-fourth of a revolution or the extent of the projecting portion of the cam 67 is made to effect the complete discharge of the bundle.

As before stated, the cord-knotting mechanism is not one of the essential factors of the invention and almost any one of the many types could be adapted for use in this connection. In Fig. 15 is shown a cord-knotting device on the upper and lower knotter-shafts, the upper one being shown partly broken away. In this figure, 69 represents the knotter-frame, and 70 the knotter-cam. 71 is the cord-holder, and 72 the knotter-hook, all of which serve the usual functions of these elements in cord-knotting devices. 73 designates the breastplates, located beneath the lower and above the upper grain passage-ways, as shown in Fig. 15.

The operation of the mechanism is as follows: The grain is delivered between the elevator-rollers 8 and 8' (see Fig. 15) into the initial receptacle 23², and assuming the needle occupies its lower position, as shown in this figure, the packers will revolve in the direction indicated by the arrow and force the grain into the upper grain passage-way 23 against the yielding gate or compressor-hook 36². When enough for a bundle has accumulated, the compressor rock-shaft 36 will, through the compressor-link 39, actuate the trip-latch 45 on the compressor-arm 41, as before described in detail. The trip-latch 45 being disengaged from the dog 34³ will cause the pawl 34' to engage the clutch-sprocket 32 and, through the clutch-gear 33, communicate motion to the cam-gear 53, which being directly connected to the upper knotter-shaft will actuate the cord-knotting mechanism thereon. Through the bevel-pinion 52 on the upper knotter-shaft and the meshing pinion on the gear-shaft 44 corresponding movement will be communicated to the lower cord-knotting device. The discharge-arm on the lower knotter-shaft will eject the bundle which has has been previously formed and tied in the lower grain passage-way. The needle-shaft, actuated through the pitman connections formed by the links 60 and 62 and 61 and 63, will actuate the needle, causing it to move upwardly and coöperating in the usual manner with the cord-knotting device on the upper knotter-shaft compress and tie the bundle in the upper grain passage-way. Simultaneously with the needle reaching its upper limit the trip-latch 45 will be moved into the path of the forward trip-stop 34⁴, which will cause the pawl 34' to be disengaged from the series of teeth 32' on the clutch-sprocket 32, thus disengaging and stopping the binding mechanism. During the upward movement of the needle the bevel gear-shaft 44 will be moved one-half a revolution, in which movement it will disengage the clutch mechanism on the packer-shaft 7, the clutch-sleeve 29 being first disengaged from the clutch on the sprocket-gear 27. Through the cam 44³ on said gear-shaft and the shifting-lever 30 in connection therewith the said clutch will be held out of engagement, thus causing the packers to remain inoperative until the needle has practically reached its upper limit, at which time the said cam 44³ will have moved to the opposite side and vibrated the said lever in the opposite direction, thus throwing the clutch-sleeve 29 into engagement with the gear 24 on the forward end of the packer-shaft. The packers will now be rotated in an opposite direction, thus forcing the grain into the lower grain passage-way 23'. (See Fig. 15.) The bundle just formed and tied in the upper grain passage-way will remain compressed until the needle returns to its lower position. The formation of the bundle and tying of the same is completed in the same manner below as above. Fig. 3 shows the position of the tripping and compressing mechanism before the needle has started for its upper position. Here it will be seen that the roller 49 on the rear compressor-arm 41 when the cam 50 is made to rotate in the direction indicated by the arrow will be made to ride on the crest of said cam and move the compressor-hook $36^2$ on the upper compressor-shaft from the position indicated by dotted lines in Fig. $3^a$ to the position shown by full lines in the same figure. In this way the compression or "walk-up" is effected while the bundle is being tied above, and simultaneous with this movement it will be seen from an inspection of Figs. 3 and $3^a$ that the roller on the forward compressor-arm, which in Fig. 3 is shown to rest upon the highest part of the cam, will soon pass over the crest thereof, dropping into the depression of the forward cam 51. The tappet-pin $50^2$ on said forward cam will engage the spur $41^2$ on the compressor-arm, and in the event the roller does not show a disposition to follow the contour of the cam it will be compelled to do so. This will effect the tripping of the lower compressor-arm, which will be caused to move from the position indicated by the dotted lines in Fig. $3^a$ to the position shown in full lines in same figure, and simultaneous with this movement the lower discharge-arm is operated as before described, thus ejecting the bundle from the grain passage-way. The bundle is ejected from the upper grain passage-way in the same manner as from below, and in the operation thereof the cams shown in Figs. 3 and $3^a$ would occupy a position just the reverse of that given.

In the above-described operation the packing mechanism will be thrown out of operation during the period of time occupied by the movement of the needle and will be alternately reversed to move the grain into the upper and lower grain passage-ways. The cam 17 on the needle-shaft through the connecting-link 16 will shift the packer-cams 15', thus causing the packer-arms to become operative at the proper time. It will be seen from an inspection of Fig. 15 that the packer-arms should become operative practically at the upper terminus of the lower grain passage-way when forcing the grain into the upper grain passage-way or practically at the point indicated by the line $a\ a$, Fig. 15. On the other hand, when forcing the grain into the lower grain passage-way the packers should become operative or radially rigid when substantially at the mouth of the upper grain passage-way, which is indicated by the line $b\ b$ in the same figure. The details of the operation of the packer-shifting mechanism, the tripping mechanism, the pitman connection, the needle, the discharge-arms, &c., are believed unnecessary in view of the above general description of the operation when taken in connection with the description of the construction and operation of the detail parts heretofore given.

Modifications in the construction of the details of this invention could be made without departing from the spirit of the invention. For instance, different forms of packer-tripping mechanism might be used. Variations might be made in the tripping mechanism or in the needle-actuating mechanism and still employ the use of a double-acting needle cooperating with two cord-knotting devices.

What I claim as my invention, and desire to secure by Letters Patent, is—

1. In a binder attachment for harvesters, in combination, a binder-deck, upper and lower grain-shields forming with said deck the upper and lower grain passage-ways, and means for introducing the grain into either of said passage-ways, substantially as set forth.

2. In a binder attachment for harvesters, in combination, a binder-deck, upper and lower grain-shields forming with said deck the upper and lower grain passage-ways, and means for introducing the grain alternately into either of said passage-ways, substantially as set forth.

3. In a binder attachment for harvesters, in combination, a binder-deck, upper and lower grain-shields forming with said deck the upper and lower grain passage-ways, and intermittently-operating means for introducing the grain alternately into either of said passage-ways, substantially as set forth.

4. In a duplex binder, in combination, a binder-deck, upper and lower grain-shields forming with said deck the upper and lower grain passage-ways, and single means intermittently operating and automatically reversible for introducing the grain alternately into either of said passage-ways, substantially as set forth.

5. In a binder attachment for harvesters, in combination, a binder-deck, upper and lower grain-shields forming with said deck the upper and lower grain passage-ways, means for introducing the grain into either of said passage-ways, and a yielding compressor arm or gate arranged at the discharge end of each of said grain passage-ways, substantially as set forth.

6. In a binder attachment for harvesters, in combination, a binder-deck, upper and lower grain-shields forming with said deck the upper and lower grain passage-ways, single means for introducing the grain alternately into either of said passage-ways, and a yielding and releasable compressor arm or gate arranged at the discharge end of each of said grain passage-ways, substantially as set forth.

7. In a binder attachment for harvesters, in combination, an initial grain-receptacle, a binder-deck, upper and lower grain-shields forming with said deck the upper and lower grain passage-ways which terminate above in said initial grain-receptacle, and means for passing the grain from the initial receptacle into either of the said grain passage-ways, substantially as set forth.

8. In a duplex binder attachment for harvesters, in combination, a binder-deck, upper and lower grain-shields forming with said deck the upper and lower grain passage-ways, means for introducing the grain into either of said passage-ways, a yielding compressor arm or gate located at the discharge end of each of said grain passage-ways, and cord carrying and knotting mechanism arranged to operate both above and below said grain-deck, substantially as set forth.

9. In a duplex binder attachment for harvesters, in combination, a binder-deck, upper and lower grain-shields forming with said deck an upper and a lower grain passage-way, packers for forcing the grain therein, a knotting device located adjacent to each of said grain passage-ways, and cord-carrying mechanism arranged to coöperate alternately with said knotting devices, substantially as set forth.

10. In a duplex binder attachment for harvesters, in combination, a binder-deck, upper and lower grain-shields forming with said deck an upper and a lower grain passage-way, packers for forcing the grain therein, an upper and a lower knotting device located adjacent to each of said grain passage-ways, and a double-pointed needle arranged to coöperate alternately with said upper and lower knotting devices, substantially as set forth.

11. In a duplex binder attachment for harvesters, in combination, a binder-deck, upper and lower grain-shields forming with said deck an upper and a lower grain passage-way, a single set of reversing-packers for forcing the grain alternately into one or the other of the grain passage-ways, and cord carrying and knotting mechanisms arranged to operate both above and below said grain-deck, substantially as set forth.

12. In a duplex binder attachment for harvesters, in combination, upper and lower cord-knotting devices, a single cord-carrying mechanism coöperating alternately with said upper and lower cord-knotting devices, and packers for presenting the grain thereto, substantially as set forth.

13. In a duplex binder attachment for harvesters, in combination, upper and lower cord-knotting devices, a single cord-carrying mechanism coöperating alternately with said upper and lower cord-knotting devices, and a single set of reversing-packers for presenting the grain thereto, substantially as set forth.

14. In a duplex binder attachment for harvesters, in combination, upper and lower cord-knotting devices, a single cord-carrying mechanism coöperating alternately therewith, and a single set of intermittently-operating reversing-packers, substantially as set forth.

15. In a duplex binder attachment for harvesters, in combination, upper and lower cord-knotting devices, cord-carrying mechanism coöperating therewith, compressor-arms, packers for forcing the grain thereagainst, and means for actuating the cord-knotting devices in a constant direction and for rocking the cord-carrying mechanism in alternately opposite directions, substantially as set forth.

16. In a duplex binder attachment for harvesters, in combination, upper and lower cord-knotting devices, a single cord-carrying mechanism coöperating alternately with the said upper and lower cord-knotting devices, yielding trip and compressor arms, packers for forcing the grain thereagainst, and means for actuating the cord-knotting devices in constant but opposite directions and for rocking the said cord-carrying mechanism in alternately opposite directions, substantially as set forth.

17. In a duplex binder attachment for harvesters, in combination, upper and lower cord-knotting devices, a single cord-carrying mechanism coöperating alternately with the said upper and lower cord-knotting devices, yielding trip and compressor arms, a single set of intermittently-operating reversing-packers for forcing the grain against the said compressor and trip arms, and means for actuating the cord-knotting devices in constant but opposite directions and for rocking the said cord-carrying mechanism in alternately opposite directions, substantially as set forth.

18. In a duplex binder attachment for harvesters, in combination, a binder-deck, upper and lower grain-shields forming with said deck an upper and a lower grain passage-way, and means for introducing the grain into either of said passage-ways, said means comprising a packer-shaft, packer-arms flexibly mounted thereon, and a double cam for throwing said packer-arms into and out of operative position, substantially as set forth.

19. In a duplex binder attachment for harvesters, in combination, a binder-deck, upper and lower grain-shields forming with said deck an upper and lower grain passage-way, means for introducing the grain into either of said passage-ways, said means comprising a packer-shaft, packer-arms flexibly mounted thereon, a double cam movable about its pivotal axis for throwing said packer-arms into and out of operative position, and mechanism for effecting the movement of said cam, substantially as set forth.

20. In a duplex binder attachment for harvesters, in combination, a binder-deck, upper and lower grain-shields forming with said deck an upper and lower grain passage-way, means for introducing the grain alternately into either of said passage-ways, said means comprising a reversible packer-shaft, packer-arms flexibly mounted thereon, packer-shaft reversing mechanism, a double cam movable about its pivotal axis for throwing said packer-arms into and out of operative position, and mechanism for effecting the movement of said cam, substantially as set forth.

21. In a duplex binder attachment for harvesters, in combination, a binder-deck, upper and lower grain-shields forming with said deck an upper and lower grain passage-way, reversible and intermittently-operating means for introducing the grain alternately into either of said passage-ways, said means comprising a packer-shaft, packer-arms flexibly mounted thereon, means for driving the packer-shaft, packer-shaft reversing and clutching mechanism for engaging and disengaging said shaft and driving means, a double cam movable about its pivotal axis for throwing said packer-arms into and out of operative position, and mechanism for effecting the movement of said cam, substantially as set forth.

22. In a duplex binder attachment for harvesters, in combination, a binder-deck, upper and lower grain-shields forming with said deck upper and lower grain passage-ways, means for introducing the grain into either of said passage-ways, said means comprising a packer-shaft, packer-arms flexibly mounted thereon, a double cam for throwing said packer-arms into and out of operative position, a needle, and mechanism controlled by said needle for actuating said double cam, substantially as set forth.

23. In a duplex binder attachment for harvesters, in combination, a binder-deck, upper and lower grain-shields forming with said deck upper and lower grain passage-ways, reversible and intermittently-operating means for introducing the grain alternately into either of said passage-ways, said means comprising a packer-shaft, packer-disks rigidly secured thereto, flexible packer-arms mounted upon said disks, means for driving the packer-shaft, packer-shaft reversing and clutching mechanism for reversing, engaging and disengaging said packer-shaft and said means for driving the packer-shaft, a double cam for throwing said packer-arms into and out of operative position, and suitable mechanism for actuating said double cam, substantially as set forth.

24. In a duplex binder attachment for harvesters, in combination, cord-carrying mechanism, intermittently-actuated and reversible packer-arms which remain flexible and inoperative during a portion of the rotation thereof, adjustable cams arranged to actuate the said packer-arms when the arms are moving in either direction and thus render them rigid and operative for the remaining portion of the revolution thereof, and means actuated by said cord-carrying mechanism for effecting the adjustment of said cams, substantially as set forth.

25. In a duplex binder attachment for harvesters, in combination, cord-carrying mechanism, intermittently-actuated and reversible packer-arms which remain flexible and inoperative during a portion of the rotation thereof, a pair of adjustable cams arranged to actuate said packer-arms when the arms are moving in either direction and thus render them rigid and operative for the remaining portion of the revolution thereof, and single means actuated by said cord-carrying mechanism for effecting the adjustment of said cams, substantially as set forth.

26. In a duplex binder attachment for harvesters, packers comprising a packer-shaft, a driving-clutch, clutch reversing and disengaging mechanism in connection therewith, packer-disks rigidly secured to said shaft, links pivotally mounted thereon, packer-arms carried by the free ends of said links, cams for swinging said links and packer-arms thereon outwardly, and means for holding said packer-arms when swung outwardly rigidly and radially, substantially as set forth.

27. In a duplex binder attachment for harvesters, packers comprising a packer-shaft, a driving-clutch, clutch reversing and disengaging mechanism in combination therewith, packer-disks rigidly secured to said shaft, links pivotally mounted thereon, packer-arms carried by the free ends of said links, cams for swinging said links and packer-arms thereon outwardly when said disks are rotating in either direction, and means for holding said packer-arms when swung outwardly rigidly and radially, substantially as set forth.

28. In a duplex binder attachment for harvesters, packers comprising a packer-shaft, a driving-clutch, clutch reversing and disengaging mechanism in connection therewith, packer-disks rigidly secured to said shaft, links pivotally mounted thereon, packer-arms carried by the free ends of said links, forwardly and rearwardly adjustable cams for swinging said links and packer-arms thereon outwardly when said disks are rotating in either direction, means for holding said packer-arms when swung outwardly rigidly and radially, and means for effecting the adjustment of said cams, substantially as set forth.

29. In a duplex binder attachment for harvesters, packers comprising a packer-shaft, a driving-clutch, clutch reversing and disengaging mechanism in connection therewith, two packer-disks rigidly secured to said shaft, links pivotally mounted on said disks, packer-arms carried by the free ends of said links, two cams rigidly connected with each other and forwardly and rearwardly adjustable, said cams operating to swing said links and packer-arms thereon outwardly when the said disks are moving in either direction, means for holding said packer-arms when swung outwardly rigidly and radially, and means for effecting the adjustment of said cams, substantially as set forth.

30. In a duplex binder attachment for harvesters, in combination, cord-carrying mechanism, packers comprising a packer-shaft, a driving-clutch, clutch reversing and disengaging mechanism in connection therewith, packer-disks rigidly secured to said shaft, links pivotally mounted thereon, packer-arms carried by the free ends of said links, forwardly and rearwardly adjustable cams operating to swing said links and packer-arms thereon outwardly when the said disks are moving in either direction, means for holding said packer-arms when swung outwardly rigidly and radially, and single means controlled by the said cord-carrying mechanism for effecting the adjustment of said cams, substantially as set forth.

31. In a duplex binder, in combination, a needle-shaft and a double-pointed needle mounted thereon, packer-arms, adjustable packer-cams for rendering said arms operative, a needle-shaft, a needle-shaft cam secured to said needle-shaft and movable therewith, and a link connection between said packer-cams and needle-shaft cam, substantially as set forth.

32. In a duplex binder, in combination, a needle-shaft and a double-pointed needle mounted thereon, a packer-shaft, packer-arms, two adjustable correspondingly-disposed packer-cams rigidly connected with each other and sleeved upon said packer-shaft, a binder-deck support mounted upon and intermediate of the said packer-cams, a needle-shaft cam movable with said needle, and a link pivotally connected at its upper end with the said packer-shaft cams and engaging at its lower end the said needle-shaft cam, substantially as set forth.

33. In a binder attachment for harvesters, in combination, cord-carrying mechanism, a knotter-shaft, a knot-tying device, a compressor and trip arm, a rearwardly-folding spring-held discharge-arm mounted on said knotter-shaft, and means for moving said arm to and holding it rigidly in a position substantially radial with respect to the knotter-shaft.

34. In a binder attachment for harvesters, in combination, cord-carrying mechanism, a knotter-shaft, a knot-tying device, a compressor and trip arm, a rearwardly-folding spring-held discharge-arm, and a cam-actuated guide for controlling the folding movement of said discharge-arm, said guide being movable in a direction substantially radial with respect to said knotter-shaft.

35. In a binder attachment for harvesters, in combination, cord-carrying mechanism, a knotter-shaft, a knot-tying device, a compressor and trip arm, and a rearwardly-folding spring-held discharge mechanism comprising a fixed joint, an arm pivotally secured thereto, a guide arranged to move in a radial direction with respect to said knotter-shaft for engaging and controlling the position of said arm, a cam for positively moving the guide outwardly, and a spring for returning said guide and discharge-arm in connection therewith inwardly, substantially as set forth.

36. In a binder attachment for harvesters, in combination, cord-carrying mechanism, a knotter-shaft, a knot-tying device, a compressor and trip arm, and a rearwardly-folding spring-held discharge mechanism comprising a fixed joint, an arm pivotally secured thereto, a laterally-extending hook provided on said arm, a guide movable radially of said knotter-shaft, said guide being sleeved upon said fixed joint and arm and engaging the said hook on the latter, cam-engaging means on said guide, a cam for positively moving the guide radially and outwardly and thereby rendering the arm rigid, and a spring operating to move said guide inwardly and thereby fold said arm rearwardly, substantially as set forth.

37. In a duplex binder attachment for harvesters, in combination, packer mechanism, packer-reversing mechanism in connection therewith, upper and lower cord-knotting devices, driving means interposed therebetween, and means actuated by said driving means for controlling the said packer-reversing mechanism, substantially as set forth.

38. In a duplex binder attachment for harvesters, in combination, intermittently-operating packer mechanism, mechanism for reversing and periodically stopping said packer mechanism, upper and lower cord-knotting devices, driving means interposed therebetween, and means actuated by said driving means for controlling the said packer reversing and stopping mechanism, substantially as set forth.

39. In a duplex binder attachment for harvesters, in combination, packer mechanism, packer-reversing mechanism in connection therewith, upper and lower cord-knotting devices, driving means interposed therebetween, a cord-carrying device coöperating alternately with the said upper and lower cord-knotting devices, and means actuated by said driving means for controlling the said packer reversing and stopping mechanism, substantially as set forth.

40. In a duplex binder attachment for harvesters, in combination, intermittently-operating packer mechanism, mechanism for reversing and periodically stopping said packer mechanism, upper and lower cord-knotting devices, a gear-shaft interposed therebetween, a cord-carrying device coöperating alternately with the said upper and lower cord-knotting devices, and means actuated by said gear-shaft for controlling the said packer reversing and stopping mechanism, substantially as set forth.

41. In a duplex binder attachment for harvesters, in combination, intermittently-operating packer mechanism, mechanism for reversing and periodically stopping said packer mechanism, an upper and a lower cord-knotting device, a gear-shaft interposed therebetween, a cord-carrying device coöperating alternately with the said upper and lower cord-knotting devices, a cam on said gear-shaft, and a pivotally-mounted arm, one end thereof engaging and actuating the mechanism for reversing and stopping the packer mechanism, and the other end engaging and actuated by the said cam on the gear-shaft, substantially as set forth.

42. In a duplex binder attachment for harvesters, in combination, automatically-reversible packer mechanism, upper and lower cord-knotting devices, driving means for same, cord-carrying mechanism, a double crank-arm for operating said cord-carrying mechanism, and pitman connections interposed between said double crank-arm and said driving means for the upper and lower cord-knotting devices, substantially as set forth.

43. In a duplex binder attachment for harvesters, in combination, automatically-reversible packer mechanism, upper and lower cord-knotting devices, driving means for same, cord-carrying mechanism, an adjustable double crank-arm for operating said cord-carrying mechanism, and pitman connections interposed between said double crank-arm and said driving means for the upper and lower cord-knotting devices, substantially as set forth.

44. In a duplex binder attachment for harvesters, in combination, automatically-reversible packer mechanism, an upper and a lower cord-knotting device, driving means for same, cord-carrying mechanism, an adjustable double crank-arm for operating said cord-carrying mechanism, and jointed pitman connection interposed between said double crank-arm and said driving means for the upper and lower cord-knotting devices, substantially as set forth.

45. In a duplex binder attachment for harvesters, in combination, automatically-reversible packer mechanism, upper and lower cord-knotting devices, driving means for same, a needle-shaft, a double-pointed needle secured thereto and coöperating with the said upper and lower cord-knotting devices, a double crank-arm secured to the forward end of said needle-shaft and laterally adjustable relative thereto, and rule-jointed pitmen connecting said double crank-arm and said driving means for the upper and lower cord-knotting devices, substantially as set forth.

46. In a duplex binder attachment for harvesters, in combination, automatically-reversible packer mechanism, upper and lower cord-knotting devices, driving means for same, a needle-shaft, a double-pointed needle secured thereto and coöperating with said upper and lower cord-knotting devices, a double crank-arm secured to the forward end of said needle-shaft and laterally disposed relative thereto, rule-jointed pitmen connecting said double crank-arm and said driving means for the cord-knotting devices, and means in connection with said double crank-arm for "breaking" the joints of said pitmen, substantially as set forth.

47. In a duplex binder attachment for harvesters, in combination, upper and lower grain-shields, a binder-deck comprising two branches united at their lower ends, diverging upwardly and terminating in a loop, the said binder-deck forming with said grain-shields an upper and a lower grain passage-way, reversible packer mechanism located within the loop of said deck and operating to introduce the grain alternately into either the upper or lower grain passage-ways, and compressor-arms forming yielding gates at the lower end of each of said grain passage-ways, substantially as set forth.

48. In a duplex binder attachment for harvesters, in combination, packer mechanism, cord-carrying mechanism, upper and lower cord-knotting devices, actuating means therefor, and positive operative connecting means interposed between the said upper and lower cord-knotting devices, substantially as set forth.

49. In a duplex binder attachment for harvesters, in combination, packer mechanism, cord-carrying mechanism, upper and lower cord-knotting devices, single means for actuating one of said devices and a positive operative connecting means interposed between the said upper and lower cord-knotting devices, said connecting means operating as a driver for the other one of the said devices, substantially as set forth.

50. In a duplex binder attachment for harvesters, in combination, packer mechanism, cord-carrying mechanism, upper and lower cord-knotting devices, driving means for actuating the upper one thereof, and a gear-shaft with suitable gearing thereon operatively connecting the said upper and lower cord-knotting mechanism, substantially as set forth.

PETER PAUL COLER.

Witnesses:
 CHAS. F. WALTERS,
 WM. B. FISK.